(12) United States Patent
Ajanovic

(10) Patent No.: US 10,685,675 B2
(45) Date of Patent: Jun. 16, 2020

(54) NON-ROTATING OPTICAL STORAGE USING ADJUSTABLE MIRRORS

(71) Applicant: Jasmin Ajanovic, San Francisco, CA (US)

(72) Inventor: Jasmin Ajanovic, San Francisco, CA (US)

( * ) Notice: Subject to any disclaimer, the term of this patent is extended or adjusted under 35 U.S.C. 154(b) by 0 days.

(21) Appl. No.: 15/987,037

(22) Filed: May 23, 2018

(65) Prior Publication Data

US 2018/0268855 A1    Sep. 20, 2018

Related U.S. Application Data

(63) Continuation of application No. 15/675,522, filed on Aug. 11, 2017, now Pat. No. 9,990,953, which is a continuation of application No. 15/357,774, filed on Nov. 21, 2016, now Pat. No. 9,741,384.

(51) Int. Cl.

| | | |
|---|---|---|
| *G11B 7/0065* | (2006.01) | |
| *G11B 7/09* | (2006.01) | |
| *G11B 7/1362* | (2012.01) | |
| *G11B 7/127* | (2012.01) | |
| *G11B 7/005* | (2006.01) | |
| *G11B 7/013* | (2006.01) | |
| *G11B 7/007* | (2006.01) | |
| *G11B 7/085* | (2006.01) | |

(52) U.S. Cl.
CPC ............... *G11B 7/09* (2013.01); *G11B 7/005* (2013.01); *G11B 7/007* (2013.01); *G11B 7/013* (2013.01); *G11B 7/085* (2013.01); *G11B 7/127* (2013.01); *G11B 7/1362* (2013.01)

(58) Field of Classification Search
CPC ........... G11B 7/09; G11B 7/005; G11B 7/013; G11B 7/127; G11B 1/1362; G11B 7/1353; G11B 7/0903; G11B 2007/0013; G11B 7/24; G11B 7/00; G11B 7/14; G11B 7/1374; G11B 3/30; G11B 19/2645; G11B 17/225; G11B 17/22; G11B 17/30
USPC ............. 369/103, 94, 95, 44.37, 112.08, 177
See application file for complete search history.

(56) References Cited

U.S. PATENT DOCUMENTS

| | | | |
|---|---|---|---|
| 6,151,289 A | 11/2000 | Rope | |
| 6,205,106 B1* | 3/2001 | Toth | G11B 7/0033 365/108 |
| 7,830,770 B1* | 11/2010 | Linnell | G03H 1/02 369/103 |

* cited by examiner

*Primary Examiner* — Nabil Z Hindi
(74) *Attorney, Agent, or Firm* — Esplin & Associates, PC

(57) ABSTRACT

Systems and methods for long-term non-volatile non-rotating optical storage of digital information rely on storage elements that include optical storage media, an access subsystem configured to access bits of information from one of the storage elements, and a support structure configured to support multiple storage elements. A laser used to retrieve and/or record bits of digital information may be moved along two orthogonal dimensions while the storage element is non-rotating.

15 Claims, 6 Drawing Sheets

NON-ROTATING OPTICAL STORAGE USING ADJUSTABLE MIRRORS

FIELD OF THE DISCLOSURE

This disclosure relates to systems and methods for non-rotating optical storage of digital information, and, in particular, on using storage elements that include optical storage media arranged such that adjacent bits of digital information line up in one or more straight lines.

BACKGROUND

Optical storage of digital information is common, in particular using flat discs such as compact discs (CDs), digital versatile discs or digital video discs (DVDs), and Blu-ray discs (including Ultra HD Blu-ray and similar variations). In these cases, a disc is rotated to read (retrieve) and/or write (record) information.

SUMMARY

One aspect of the disclosure relates to a system configured for non-rotating optical storage of digital information. Applications for optical storage include, but are not limited to long-term storage, non-volatile storage, low-power storage, backup storage, low-cost storage, and/or other types of storage of digital information, as well as combinations thereof. As used herein, long-term storage may refer to storage and/or retention exceeding a duration of 5 years, 10 years, 20 years, 30 years, 40 years, 50 years, 100 years, and/or another duration. To facilitate long-term storage, storage media may need to be robust (e.g. capable of withstanding a wide range of conditions for temperature, humidity, light exposure, mechanical pressure, physical handling by machines or people, and/or other conditions). As used herein, non-volatile storage may refer to storage that is persistent regardless of the provision of electrical power. As used herein, low-power storage may refer to storage that consumes less power per bit of information than hard-disk-drive (HDD) technology. As used herein, backup storage may refer to storage that is accessed infrequently and/or storage that is not latency sensitive. As used herein, low-cost storage may refer to storage that is cheaper per bit of information than hard-disk-drive (HDD) technology. For example, an application for optical storage may include a data center, including but not limited to a so-called "cold" storage data center. In some implementations, a storage data center may have a capacity of 10s, 100s, 1000s, or more ExaBytes of digital information. In some implementations, a storage center may have a capacity of 10s, 100s, 1000s, or more ZettaBytes.

In some implementations, the system may include one or more storage elements, one or more access subsystems, one or more support structures, electronic storage, one or more physical processors, one or more optical access components, one or more lasers, one or more computing devices, external resources, and/or other components. The one or more physical processors may be configured by machine-readable instructions, e.g. to provide information-processing capabilities and/or execute computer program components. In some implementations, similar functionality may be performed by hardwired components, analog components, and/or combinations thereof. Executing the machine-readable instructions may cause the one or more physical processors to assist in facilitating optical storage of digital information. The machine-readable instructions may include and/or implement one or more of a position component, a read component, a write component, a transfer element component, a transfer information component, and/or other components.

In some implementations, the system may include multiple storage elements (also referred to as storage units), including a first storage element, a second storage element, a third storage element, a fourth storage element, and so forth. In some implementations, a system may include dozens, hundreds, thousands, or more storage elements, e.g. arranged in some organized manner. A storage element may include optical storage media. In some implementations, storage elements may be rectangular, e.g. square. In some implementations, the length and width of a storage element may be 10, 20, 30, 40, 50, 100, and/or more times greater than the depth/thickness. As used herein, a storage element may be referred to as a "plate."

In some implementations, the optical storage media of a storage element may be arranged in a grid. For example, the optical storage media may be arranged in a multi-dimensional grid having at least two dimensions. In some implementations, the first and second dimension may be orthogonal. In some implementations, the first and second dimension may be referred to as the "X" and "Y" dimension of the optical storage media of a storage element. In some implementations, the optical storage media arranged at a particular and fixed depth of the storage element may be referred to as a layer of optical storage media and/or a layer of the storage element. The optical storage media of a particular storage element having a single layer of optical storage media may be arranged in a multi-dimensional grid having exactly two dimensions. The optical storage media of a particular storage element having multiple layers of optical storage media may be arranged in a multi-dimensional grid having more than two dimensions, since the multiple layers may be arranged in a dimension that is orthogonal to the "X" and "Y" dimension of the optical storage media within a layer. In some implementations, a storage element may have 1, 2, 3, 4, 5, 6, 7, 8, and/or more layers of optical storage media per individual storage element. For example, the optical storage media of a particular storage element having multiple layers may be arranged in a multi-dimensional grid having three dimensions: the "X" and "Y" dimensions and a third dimension for the multiple layers of optical storage media.

In some implementations, a storage element may include optical storage media on different and/or opposite sides of the same storage element. In some implementations, a storage element may include optical storage media on different and/or opposite surfaces of the same storage element. For example, a particular storage element may include two layers of optical storage media on a first side and two layers of optical storage media on a second side that is opposite the first side. As used herein, such opposite sides may be referred to as the top and bottom of the particular storage element.

In some implementations, the system may include one or more access subsystems configured to facilitate access to storage elements and/or access to read and/or write digital information on storage elements. In some implementations, an access subsystem may include one or more processors configured by machine-readable instructions. In some implementations, an access subsystem may include one or more optical access components, one or more lasers, optical sensors, optical lenses, and/or other components. A laser, e.g. a blue laser, may be used to retrieve digital information from a storage element. A laser, e.g. a blue laser, may be used to record digital information on a storage element.

In some implementations, an access subsystem may be configured to position storage elements in relation to the access subsystem and/or one or more components thereof. For example, an access subsystem may be configured to position a particular storage element—or a portion thereof—in relation to a particular laser, e.g., to facilitate read/write access. In some implementations, an access subsystem may be configured to position the access subsystem and/or one or more components thereof in relation to one or more storage elements. The access subsystem may be configured to accomplish positioning using non-rotational movement. For example, during read/write access, storage elements may be moved non-rotationally along a first and/or second dimension. For example, a particular storage element may be moved along the "X" and "Y" dimensions during read/write access. Since storage elements may not rotate during read/write access, adjacent bits of information stored on a storage element may line up in one or more straight lines, rather than along a spiral as in, e.g., DVD technology.

In some implementations, access subsystems may be configured to control movement of at least one of a storage element, an access subsystem, and/or one or more components thereof along a first and/or second dimension. In some implementations, the movement along a first and/or second dimension may be linear movement. In some implementations, non-rotational movement may be facilitated by one or more linear motors. In some implementations, linear motors may be controlled by one or more processors. In some implementations, the movement along a first and/or second dimension may be controlled to determine and/or select the portion of a storage element from which digital information is retrieved. In some implementations, the movement along a first and/or second dimension may be controlled to determine and/or select the portion of a storage element on which digital information is to be recorded.

In some implementations, the system may include one or more support structures configured to support storage elements. In some implementations, a support structure may be configured to selectively transfer one of more storage elements from the support structure to an access subsystem, and/or vice versa. In some implementations, a particular access subsystem may be configured to selectively transfer one of more storage elements from a support structure to the particular access subsystem, and/or vice versa. In some implementations, a particular access subsystem and a particular support structure may operate jointly and/or in concert to selectively transfer one or more storage elements from the particular access subsystem and the particular support structure, and/or vice versa. In some implementations, a support structure may be configured to removably support multiple storage elements.

The system and/or the components thereof may include and/or implement a position component configured to control the position and/or movement of a storage element in relation to an access subsystem, an optical access component, a laser, and/or another component of an access subsystem. The position and/or movement of a particular storage element may be controlled to select one or more portions of the particular storage element from which digital information is to be retrieved and/or on which digital information is to be recorded.

The system and/or the components thereof may include and/or implement a read component configured to retrieve, using one or more lasers of one or more optical access components, digital information from storage elements while the storage elements are non-rotating. The read component may be configured to aggregate retrieved digital information.

The system and/or the components thereof may include and/or implement a write component configured to record, using one or more lasers of one or more optical access components, digital information on storage elements while the storage elements are non-rotating. The write component may be configured to aggregate digital information to be recorded. For example, the write component may be configured to obtain digital information prior to the digital information being recorded.

The system and/or the components thereof may include and/or implement a transfer element component configured to selectively transfer storage components, e.g., between a support structure and an access subsystem. In some implementations, the transfer element component may be configured to transfer storage elements from a first support structure to a second support structure.

The system and/or the components thereof may include and/or implement a transfer information component configured to transfer digital information from an external resource to the system, and/or vice versa. For example, the transfer information component may be configured to transfer digital information retrieved from a storage element to a computing device. For example, the transfer information component may be configured to transfer digital information retrieved from a storage element to other electronic storage. For example, the transfer information component may be configured to transfer digital information from a computing device to the system to be recorded on a storage element. For example, the transfer information component may be configured to transfer digital information from other electronic storage to the system to be recorded on a storage element.

In some implementations, transfer of digital information by the transfer information component may be accomplished through a transceiver. In some implementations, transfer of digital information by the transfer information component may be accomplished through a wired and/or wireless connection. In some implementations, the transfer information component may be configured to transfer digital information from an external resource to the system, and/or vice versa. In some implementations, the transfer information component may be configured to transfer digital information from a computing device to the system, and/or vice versa. Computing devices may include, by way of non-limiting example, client computing platforms, desktop computers, a laptop computers, a handheld computers, NetBooks, mobile telephones, smartphones, tablets, (smart) watches, personal medical devices, mobile computing platforms, gaming consoles, televisions, electronic devices, and/or other computing devices.

One aspect of the disclosure relates to methods for non-rotating optical storage of digital information.

As used herein, any association (or relation, or reflection, or indication, or correspondency) involving storage elements, access subsystems, support structures, optical access components, instructions, bits of digital information, optical storage media, lasers, dimensions, computing devices, or another entity or object that interacts with any part of the system or plays a part in the operation of the system, may be a one-to-one association, a one-to-many association, a many-to-one association, or a many-to-many association or N-to-M association (note that N and M may be different numbers greater than 1).

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
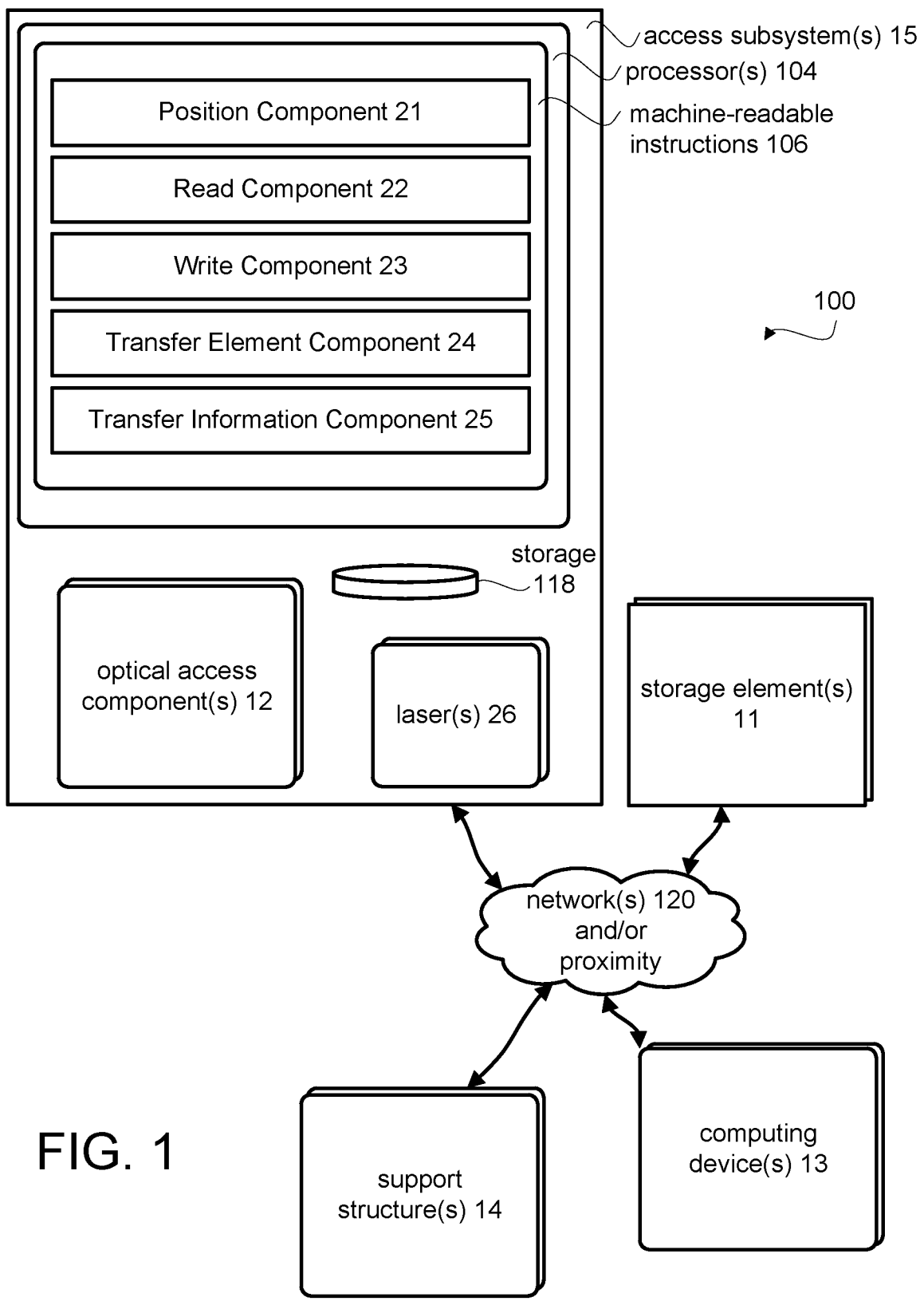
FIG. 1 illustrates a system configured for non-rotating optical storage of digital information, in accordance with one or more implementations.

FIG. 1 illustrates a system 100 configured for non-rotating optical storage of digital information. Applications for optical storage include, but are not limited to long-term storage, non-volatile storage, low-power storage, backup storage, low-cost storage, and/or other types of storage of digital information, as well as combinations thereof. For example, an application for optical storage may include a data center.

System 100 may include one or more storage elements 11 (also referred to as optical storage elements or optical information storage elements), one or more access subsystems 15, one or more support structures 14, electronic storage 118, one or more physical processors 104, one or more optical access components 12, one or more lasers 26, one or more computing devices 13, external resources, and/or other components. The one or more physical processors 104 may be configured by machine-readable instructions 106, e.g. to provide information-processing capabilities and/or execute computer program components. In some implementations, similar functionality may be performed by hardwired components, analog components, and/or combinations thereof. Executing the machine-readable instructions may cause the one or more physical processors 104 to assist in facilitating optical storage of digital information. Machine-readable instructions 106 may include and/or implement one or more of a position component 21, a read component 22, a write component 23, a transfer element component 24, a transfer information component 25, and/or other components. Components of system 100 may be coupled through one or more networks 120, through mechanical coupling, through proximity, and/or otherwise coupled to facilitate operation as described herein.

By virtue of the systems and methods described herein, applications for optical storage may be implemented having an advantageous—if not unprecedented—tradeoff in capacity, cost, bandwidth, and/or other features pertinent to digital information storage.

Figure 3A:
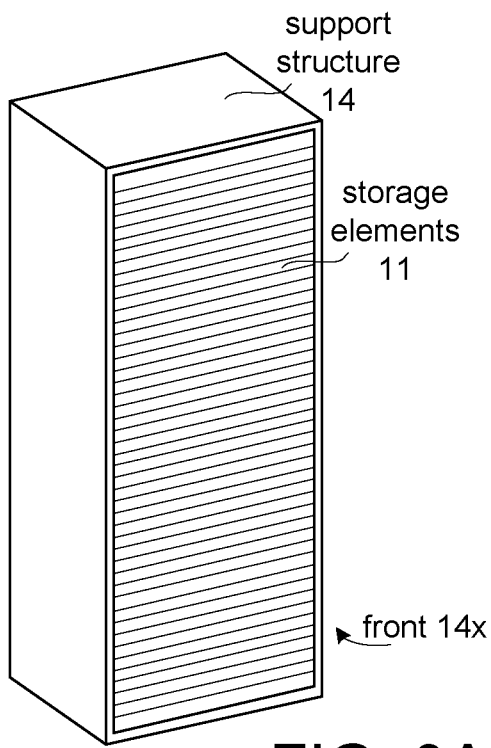
FIGS. 3A-3B-3C-3D illustrate exemplary support structures of a system configured for non-rotating optical storage of digital information.

System 100 may include one or more support structures 14 configured to support storage elements 11. By way of non-limiting example, FIG. 3A illustrates a support structure 14 configured to support multiple storage elements 11, as viewed from the front. As depicted in FIG. 3A, support structure 14 may support about 45 storage elements, but this depiction is not intended to be limiting. Support structure 14 may be configured to support anywhere from a few to thousands of storage elements, depending on the particular implementation. As depicted in FIG. 3A, support structure 14 may be oriented in a manner similar to a storage rack, equipment rack, computer rack, and/or server rack. For example, individual storage elements 11 may be oriented horizontally and slide out laterally, via a front 14x of support structure 14, as depicted in FIG. 3A. For example, multiple storage elements 11 may be stacked vertically, as depicted in FIG. 3A. The particular orientation depicted in any of the figures is not intended to be limiting. For example, a support structure may be oriented such that individual storage elements are arranged vertically and slide out laterally, similar to the orientation of storing books on a bookshelf. In some implementations, a support structure may be oriented such that individual storage elements are arranged vertically and slide out upward, similar to the orientation of removing bottles from a crate, or dishes from a dishwasher tray. In some implementations, support structure 14 may be constructed as a purely mechanical structure that does not require any (electrical) power, cooling, or other electrical/ electronic infrastructure. For example, other components of system 100, e.g. access subsystem 15, may contain electrical/electronic infrastructure and/or require power and/or cooling. Support structure 14 may be robust (e.g. capable of withstanding a wide range of conditions for temperature, humidity, light exposure, mechanical pressure, physical handling by machines or people, and/or other conditions).

Figure 3B:
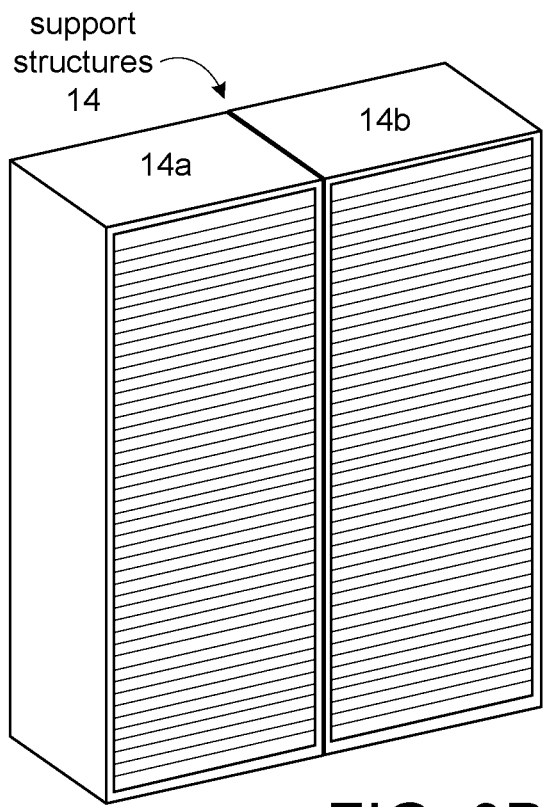

In some implementations, system 100 may include multiple support structures 14. By way of non-limiting example, FIG. 3B illustrates two support structures 14, labeled "14a" and "14b," each of which is configured to support multiple storage elements. The depiction of two support structures in FIG. 3B is not intended to be limiting. In some implementations, system 100 may include dozens, hundreds, thousands, or more support structures. The side-by-side arrangement as depicted in FIG. 3B is not intended to be limiting.

Referring to FIG. 1, support structure 14 may be configured to transfer one of more storage elements from support structure 14 to access subsystem 15, and/or vice versa. In some implementations, a particular access subsystem may be configured to selectively transfer one of more storage elements from a support structure to the particular access subsystem, and/or vice versa. In some implementations, a particular access subsystem and a particular support structure may operate jointly and/or in concert to selectively transfer one or more storage elements from the particular access subsystem and the particular support structure, and/or vice versa. In some implementations, a support structure may be configured to removably support multiple storage elements.

Figure 3C:
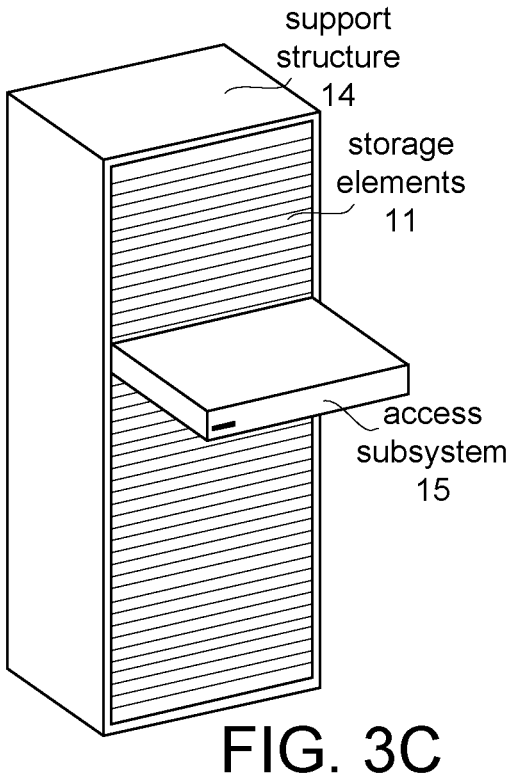
Figure 3D:
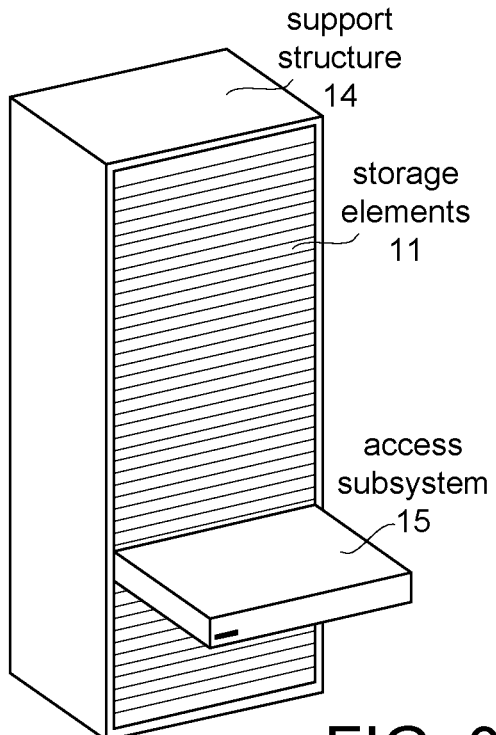

By way of non-limiting example, FIG. 3C illustrates support structure 14 configured to support multiple storage elements 11 and access subsystem 15. As depicted in FIG. 3C, access subsystem 15 may be arranged near the front of support structure 14. For example, access subsystem 15 may be configured to move up and down the front of support structure 14, through a mechanical coupling such as a railing mechanism (not depicted), in order to line up with a particular storage element. By way of non-limiting example, FIG. 3D illustrates support structure 14 and access subsystem 15 in a case where access subsystem 15 has moved down relative to its position in FIG. 3C. Access subsystem 15 depicted in FIG. 3D lines up with a different storage element as depicted in FIG. 3C. In some implementations, the front of support structure 14 may include a mechanism, by way of non-limiting example a railing mechanism, through which access subsystem 15 may be moved relative to support structure 14. As depicted in FIG. 3C and FIG. 3D, support structure 14 and/or access subsystem 15 may be configured to move access subsystem 15 vertically such that access subsystem 15 lines up selectively with different storage elements that are being supported by support structure 14.

Referring to FIG. 1, system 100 may include access subsystem 15 configured to facilitate access to storage elements 11 and/or access to read and/or write digital information on storage elements 11. In some implementations, access subsystem 15 may include one or more processors 104 configured by machine-readable instructions 106. In some implementations, access subsystem 15 may include one or more optical access components 12, one or more lasers 26, optical sensors, optical lenses, and/or other components. In some implementations, laser 26 may be used to retrieve digital information from a particular storage element 11, e.g. in cooperation with one or more optical sensing diodes. In some implementations, laser 26 may be used to record digital information on a particular storage element 11.

Figure 4A:
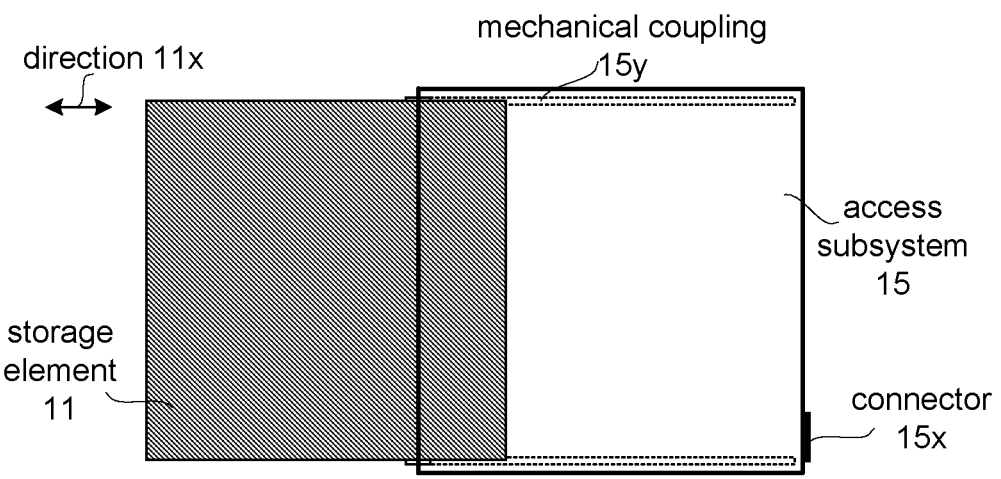
FIGS. 4A-4B-5A-5B illustrate exemplary access subsystems of a system configured for non-rotating optical storage of digital information.

By way of non-limiting example, FIG. 4A illustrates access subsystem 15 and a storage element 11, in the process of transferring storage element 11 into access subsystem 15, as viewed from the top. Storage element 11 may move relative to access subsystem 15 according to a direction 11x, as depicted. In particular, storage element 11 may be moved from a support structure into access subsystem 15, and/or vice versa. In some implementations, movement of storage element 11 may be facilitated by one or more mechanical couplings similar to mechanical coupling 15y. For example, mechanical coupling 15y may include a rail, such as a guiding rail. In some implementations, access subsystem 15 may include a connector 15x. In some implementations, connector 15x may be configured to provide power to access subsystem 15, e.g. to operate a mechanical coupling and/or otherwise physically move storage element 11 into or out of access subsystem 15. Alternatively, and/or simultaneously, in some implementations, connector 15x may be configured to transmit digital information into and/or out of access subsystem 15.

Figure 4B:
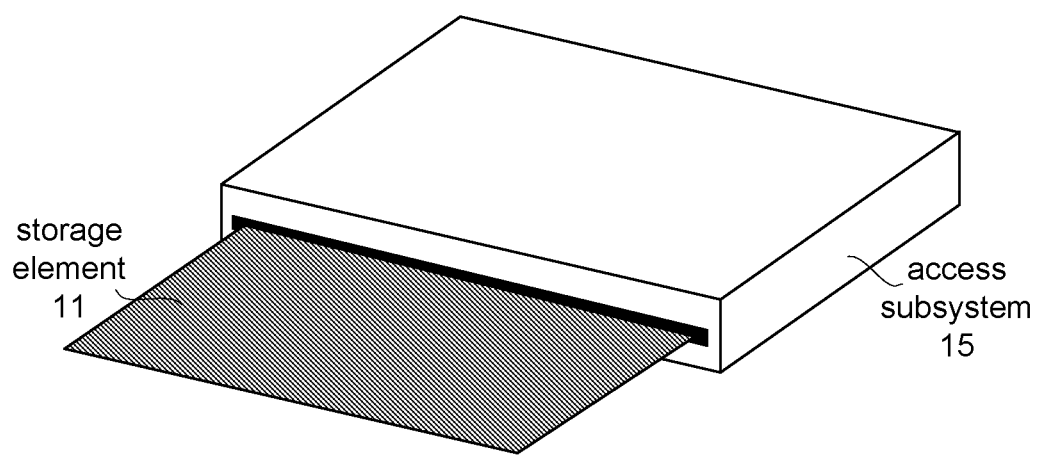

By way of non-limiting example, FIG. 4B illustrates access subsystem 15 and a storage element 11 in the process of transferring storage element 11 into access subsystem 15, as viewed from the back of access subsystem 15.

In some implementations, access subsystem 15 may be configured to position storage elements 11 in relation to the access subsystem and/or one or more components thereof. For example, access subsystem 15 may be configured to position a particular storage element 11—or a portion thereof—in relation to a particular laser 26, e.g., to facilitate read/write access. In some implementations, access subsystem 15 may be configured to position access subsystem 15 and/or one or more components thereof in relation to one or more storage elements 11. Access subsystem 15 may be configured to accomplish positioning using non-rotational movement. For example, during read/write access, storage elements 11 may be moved non-rotationally along a first and/or second dimension. For example, a particular storage element 11 may be moved along the "X" and "Y" dimensions during read/write access. Since storage elements may not rotate during read/write access, adjacent bits of information stored on a storage element may line up in one or more straight lines, rather than lining up along a spiral as in, e.g., DVD technology.

In some implementations, access subsystems 15 may be configured to control movement of at least one of storage element 11, access subsystem 15, and/or one or more components thereof along a first and/or second dimension. In some implementations, the movement along a first and/or second dimension may be linear movement. In some implementations, non-rotational movement may be facilitated by one or more linear motors (not depicted). In some implementations, linear motors may be controlled by one or more processors 104. In some implementations, the movement along a first and/or second dimension may be controlled to determine and/or select the portion of storage element 11 from which digital information is retrieved. In some implementations, the movement along a first and/or second dimension may be controlled to determine and/or select the portion of storage element 11 on which digital information is to be recorded.

In some implementations, access subsystem 15 may include one or more lasers 26. Multiple lasers 26 may operate at the same time to increase capacity, bandwidth, and/or throughput. For example, two lasers 26 may be used to retrieve digital information simultaneously and/or record digital information simultaneously. In some implementations, one or more lasers 26 may be included in optical access component 12. Multiple optical access components 12 may operate at the same time to increase capacity, bandwidth, and/or throughput. For example, two optical access components 12 (each of which may include a laser) may be used to retrieve digital information simultaneously and/or record digital information simultaneously. In some implementations, multiple optical access components 12 may be arranged in some organized way, e.g. in a two-dimensional grid. In some implementations, multiple optical access components 12 may be arranged in such a way that individual optical access components 12 (and/or individual lasers 26) correspond to and/or line up with individual portions of a particular storage element 11 (after the particular storage component 11 has been physically transferred into access subsystem 15).

In some implementations, optical access component 12 may include similar features, structures, and/or technology as existing optical access controllers used in, e.g., DVD technology, silicon photonics technology, and/or nano-photonics technology, but with at least the distinction that optical storage media are moved linearly relative to the laser (and/or vice versa) rather than rotating a disc as is done in existing optical storage technologies. By way of non-limiting example, existing optical access controllers may include one or more lasers, diodes, optical sensors, lenses, other optical components, and/or electronic components.

In some implementations, optical access component 12 may include one or more mirrors configured to redirect one or more laser beams to one or more specific spots on a particular optical media block to facilitate read/write access to digital information. In such implementations, storage element 11 and/or optical access component 12 may remain static and non-moving during read/write access. In such implementations, linear movement along the "X" and "Y" dimensions for storage element 11 and/or optical access component 12 may be reduced and/or eliminated, e.g. by virtue of using one or more mirrors to implement scanning along "X" and "Y" dimensions. In some implementations, one or more lasers and/or one or more mirrors of optical access component 12 may be configured to facilitate read/write access to digital information. For example, activation and/or positioning of the one or more lasers and/or one or more mirrors may be adjusted and/or controlled to facilitate read/write access to digital information. For example, a position of a mirror may be adjusted between read/write access to two bits of digital information, e.g. two adjacent bits of digital information.

Referring to FIG. 1, system 100 may include multiple storage elements 11. Storage element 11 may include optical storage media. In some implementations, storage elements 11 may be rectangular, e.g. square. In some implementations, the length and width of storage element 11 may be 10, 20, 30, 40, 50, 100, and/or more times greater than the depth/thickness. In some implementations, the length and/or width of storage element 11 may be about 120 mm, about 180 mm, about 240 mm, about 300 mm, about 360 mm, about 400 mm, and/or other suitable sizes. In some implementations, the length and/or width of storage element 11 may be about 4, 4.5, 5, 5.5, 6, 7, 8, 9, 10, 12, 14, 16, 18, 20, 24 inches, and/or other suitable sizes. In some implementations, the depth/thickness of storage element 11 may be about 1 mm, 1.2 mm, 1.5 mm, 2 mm, 2.5 mm, 3 mm, 4 mm, 5 mm, and/or other suitable values.

In some implementations, the optical storage media of storage element 11 may be arranged in a grid. For example, the optical storage media may be arranged in a multi-dimensional grid having at least two dimensions. In some implementations, the first and second dimension may be orthogonal. The optical storage media of storage element 11 may have one or more layers of optical storage media on either or both sides (i.e. top and bottom) of storage element 11.

Figure 6A:
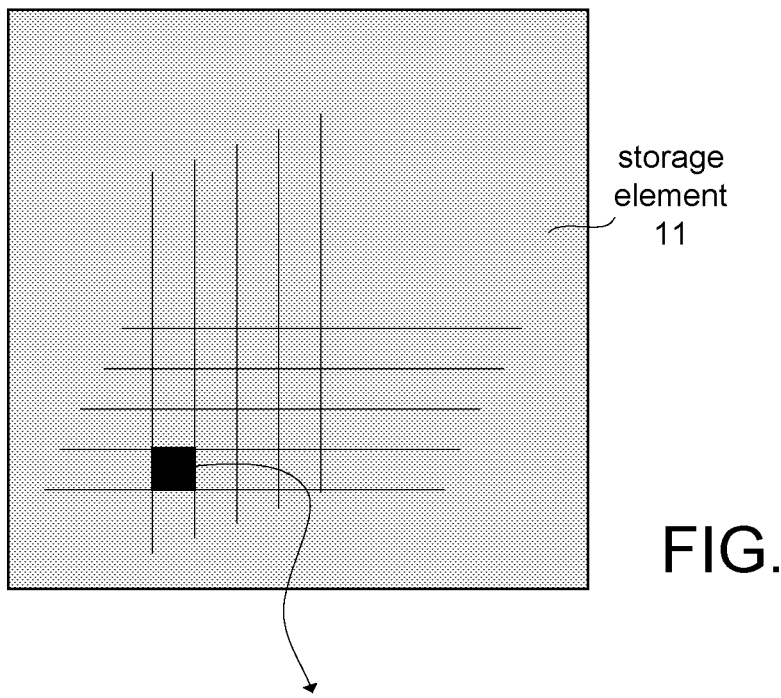
FIGS. 6A-6B-6C illustrate exemplary storage elements and portions thereof, to be used in a system configured for non-rotating optical storage of digital information, in accordance with one or more implementations.

By way of non-limiting example, FIG. 6A illustrates a square implementation of storage element 11, as viewed from the top. In some implementations, storage element 11 may include structural support in one or both of the center and the periphery of the storage element. For example, in some implementations, storage element 11 may include a frame on the outer edge to improve and/or support structural integrity and to eliminate or reduce warping, flexing, and/or other non-planar internal movement of storage element 11. In some implementations, storage element 11 may include a grid of portions or blocks of optical storage media (also referred to as optical media block 60 or OMB). In some implementations, optical media blocks may have a width and/or length of about 2 mm, 3 mm, 4 mm, 5 mm, 6 mm, 7 mm, 8 mm, 9 mm, 10 mm, 12 mm, 15 mm, 20 mm, 25 mm, 30 mm, 40 mm, 50 mm, and/or other suitable sizes. In some implementations, an individual storage element 11 may include dozens, hundreds, or thousands of optical media blocks 60. In some implementations, one or more particular optical media blocks 60 may be associated with and/or other correspond to one or more particular optical access components 12 (not depicted in FIG. 6A-6B-6C).

Figure 6B:
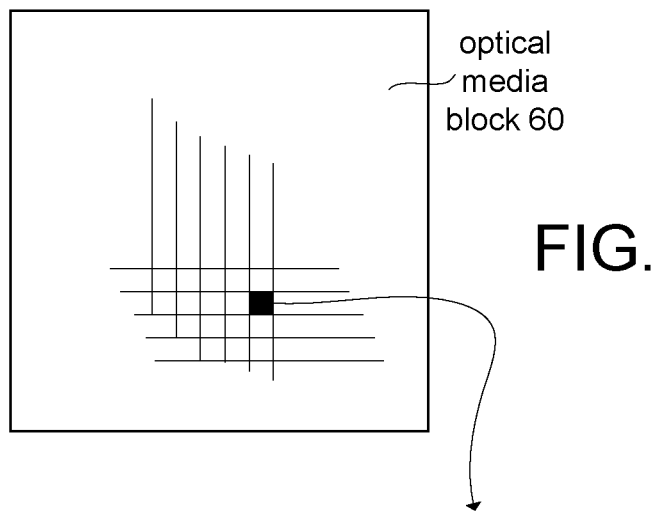
Figure 6C:
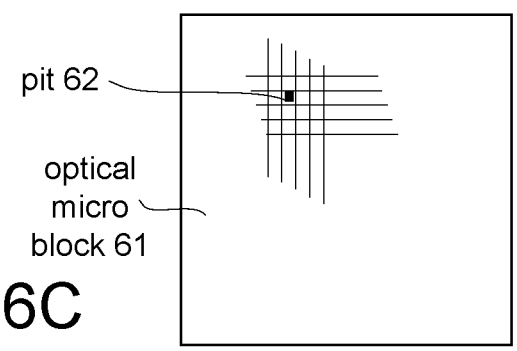

By way of non-limiting example, FIG. 6B illustrates a square implementation of optical media block 60, as viewed from the top. In some implementations, optical media block 60 may include a grid of optical micro blocks 61. In some implementations, optical micro blocks may have a width and/or length of about 1 um, 1.5 um, 2 um, 3 um, 4 um, 5 um 6 um, 7 um, 8 um, 9 um, 10 um, 20 um, 30 um, 40 um, 50 um, and/or other suitable sizes. In some implementations, an individual optical media block 60 may include hundreds, thousands, or tens of thousands of optical micro blocks 61. By way of non-limiting example, FIG. 6C illustrates a square implementation of optical micro block 61, as viewed from the top. In some implementations, optical micro block 61 may include a grid of individual pits 62 or individual bits of digital information. In some implementations, an individual optical micro block 61 may include thousands or millions of pits 62. In some implementations, an individual pit 62 may have a width and/or length of about 200 nm, 150 nm, 100 nm, 50 nm, 40 nm, 30 nm, 20 nm 10 nm, and/or other suitable sizes.

Figure 5A:
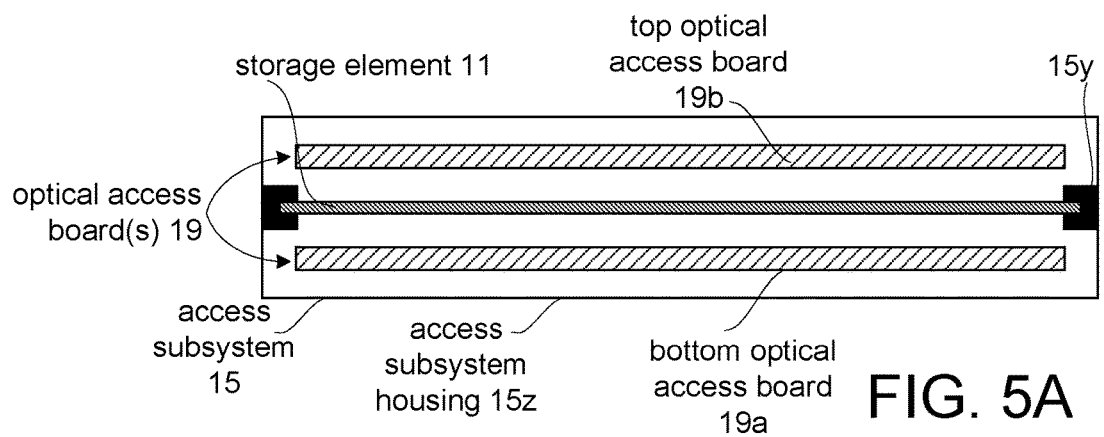
Figure 5B:
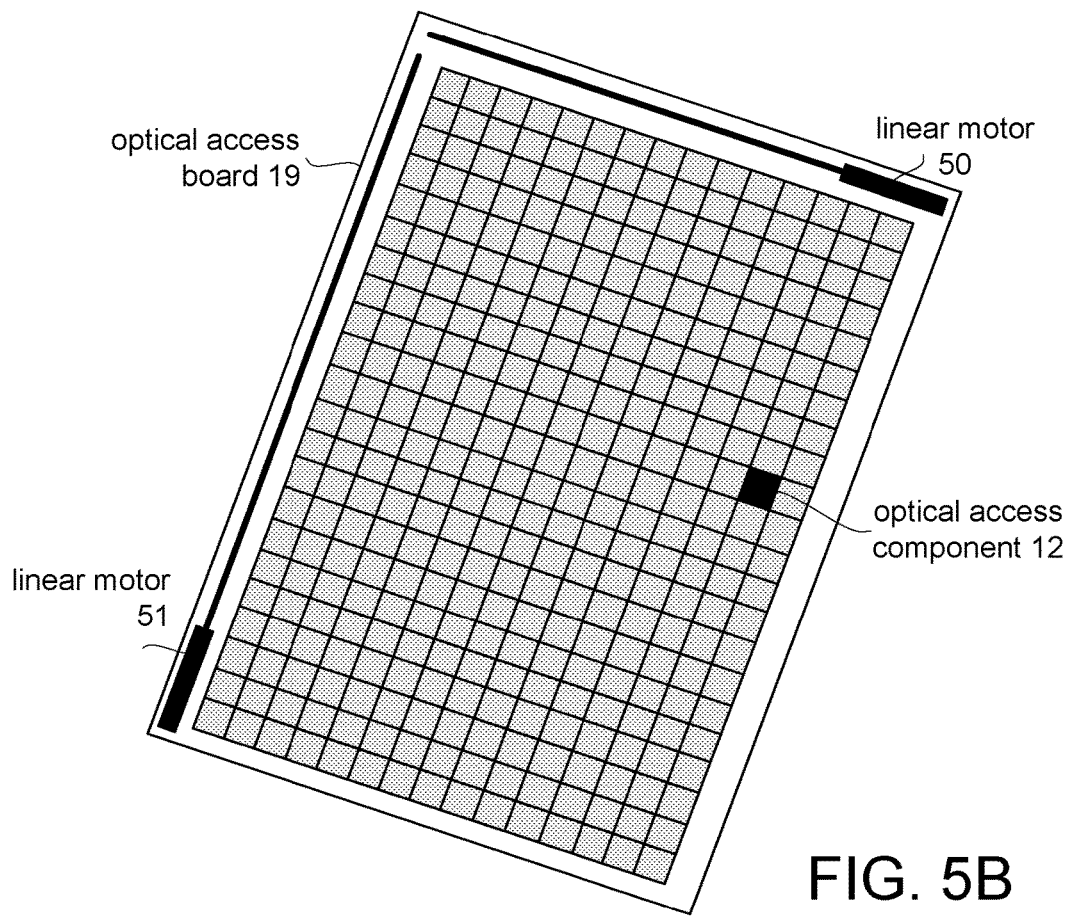

Referring to FIG. 5A-5B, in some implementations, access subsystem 15 may include two or more optical access boards 19, which may be embedded and/or integrated into access subsystem housing 15z as depicted in the front cross-section view of FIG. 5A. In some implementations, optical access boards 19 may include a top optical access board 19b and a bottom optical access board 19a, arranged at opposite sides of a particular storage element 11 (after the particular storage component 11 has been physically transferred into access subsystem 15, e.g., via mechanical coupling 15y). As depicted in FIG. 5B, optical access board 19 may include multiple optical access components 12. In some implementations, optical access components 12 may be arranged in a grid. In some implementations, individual optical media blocks of a particular storage element may be align with and/or correspond to individual optical access components 12, after the particular storage component 11 has been physically transferred in proximity of optical access board 19.

As depicted in FIG. 5B, optical access board 19 may include a first linear motor 50 and a second linear motor 51. In some implementations, through one or both of linear motor 50 and linear motor 51, the movement of individual optical access components 12 relative to a particular storage element may be controlled to facilitate read/write access to digital information on the particular storage element. In some implementations, linear motor 50 and/or linear motor 51 may be controlled to physically move optical access board 19 and thus individual optical access components thereof. In some implementations, linear motor 50 and/or linear motor 51 may be controlled to physically move the particular storage element. The depiction of linear motor 50 and linear motor 51 in FIG. 5B is not intended to be limiting. In some implementations, one or more linear motors may be positioned elsewhere within access subsystem 15, e.g. in access subsystem housing 15z as depicted in FIG. 5A. In some implementations, the linear speed or scanning speed effectuated by linear motor 50 and/or linear motor 51 may be about 400 mm/s, 600 mm/s, 800 mm/s, 1000 mm/s 1500 mm/s, 2000 mm/s, 5000 mm/s, and/or other suitable speed. In some implementations, multiple optical access components 12 may simultaneously retrieve digital information from multiple optical media blocks on one or both sides of a particular storage element. In some implementations, multiple optical access components 12 may simultaneously record digital information on multiple optical media blocks on one or both sides of the particular storage element. Referring to FIG. 5A, in some implementations, access subsystem 15 may be configured to simultaneously move top optical access board 19b and bottom optical access board 19a such that digital information is retrieved, recorded, or both retrieved and recorded simultaneously on different layers of optical storage media on opposite sides of a particular storage element. For example, information could be organized and recorded in such a way as to minimize the movement required in "X" and "Y" dimensions to retrieve a particular file or document.

Referring to FIG. 1, system 100 may include computer program components including but not limited to position component 21, read component 22, write component 23, transfer element component 24, transfer information component 25, and/or other components. In some implementations, part or all of the functionality attributed to these components may be performed by hardwired components, analog components, and/or combinations thereof.

Position component 21 may be configured to control the position and/or movement of storage element 11 in relation to one or more of access subsystem 15, optical access board 19, optical access component 12, laser 26, and/or another component of system 100. The position and/or movement of, e.g., storage element 11 may be controlled to select one or more portions of storage element 11 from which digital information is to be retrieved and/or on which digital information is to be recorded.

Read component 22 may be configured to retrieve, e.g. by using one or more lasers 26 of one or more optical access components 12, digital information from storage element 11 while storage element 11 is non-rotating. Read component 21 may be configured to aggregate retrieved digital information. In some implementations, retrieved digital information may be transferred through a connector similar to connector 15x depicted in FIG. 4A.

Referring to FIG. 1, write component 23 may be configured to record, e.g. by using one or more lasers 26 of one or more optical access components 12, digital information on storage element 11 while the storage element 11 is non-rotating. Write component 23 may be configured to aggregate digital information to be recorded. For example, write component 23 may be configured to obtain digital information prior to the digital information being recorded. For example, digital information may be obtained from an external source and/or computing device 13.

Transfer element component 24 may be configured to selectively transfer storage components 11, e.g., between support structure 14 and access subsystem 15. In some implementations, transfer element component 24 may be configured to transfer storage elements 11 from a first support structure to a second support structure.

Transfer information component 25 may be configured to transfer digital information from an external resource to system 100, and/or vice versa. For example, transfer information component 25 may be configured to transfer digital information retrieved from storage element 11 to computing device 13. For example, transfer information component 25 may be configured to transfer digital information retrieved from storage element 11 to other electronic storage such as electronic storage 118. For example, transfer information component 25 may be configured to transfer digital information from computing device 13 to system 100 to be recorded on storage element 11. For example, transfer information component 25 may be configured to transfer digital information from other electronic storage (such as electronic storage 118) to system 100 to be recorded on storage element 11.

In some implementations, transfer of digital information by transfer information component 25 may be accomplished through a transceiver (not depicted). In some implementations, transfer of digital information by transfer information component 25 may be accomplished through a wired and/or wireless connection. In some implementations, transfer information component 25 may be configured to transfer digital information from an external resource to system 100, and/or vice versa. In some implementations, transfer information component 25 may be configured to transfer digital information from computing device 13 to system 100, and/or vice versa. At least some of the components of system 100 may be physically separate and/or remote from one another.

System 100 and components thereof may be operatively linked via one or more electronic communication links. For example, such electronic communication links may be established, at least in part, via one or more networks 120. In some implementations, network 120 may include the Internet and/or may employ other communications technologies and/or protocols. By way of non-limiting example, network 120 may employ communication technologies including one or more of Ethernet, 802.11, worldwide interoperability for microwave access (WiMAX), 3G, Long Term Evolution (LTE), digital subscriber line (DSL), asynchronous transfer mode (ATM), InfiniBand, PCI Express, PCIe NVMe/NVMe over Fabric, WiFI and/or other communication technologies. By way of non-limiting example, network 120 may employ networking protocols including one or more of multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and/or other networking protocols.

Information exchanged over network 120 may be represented using formats including one or more of hypertext markup language (HTML), extensible markup language (XML), and/or other formats. One or more exchanges of information between entities of system 100 may be encrypted using encryption technologies including one or more of secure sockets layer (SSL), transport layer security (TLS), virtual private networks (VPNs), Internet Protocol security (IPsec), and/or other encryption technologies. In some implementations, one or more entities of system 100 may use custom and/or dedicated data communications technologies instead of, or in addition to, the ones described above.

It will be appreciated that this is not intended to be limiting and that the scope of this disclosure includes implementations in which system 100 and/or components thereof may be operatively linked based on proximity rather than a network. For example, components of system 100 may communicate and/or operate in concert via some other communication media.

System 100 may include electronic storage. Electronic storage 118 may be configured to store information electronically. In some implementations, electronic storage 118 may include non-optical storage. Electronic storage 118 may include electronic storage media that electronically stores information. The electronic storage media of electronic storage 118 may include one or both of system storage that is provided integrally (i.e., substantially non-removable) with system 100 and/or removable storage that is removably connectable to system 100 via, for example, a port or a drive. A port may include a USB port, a FireWire (IEEE 1394) port, and/or other port. A drive may include a disk drive and/or other drive. Electronic storage 118 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 118 may include one or more virtual storage resources (e.g., cloud storage, a virtual private network, and/or other virtual storage resources). Electronic storage 118 may store implementations of software algorithms, information determined by processor(s) 104, information received from computing devices 13, and/or other information that enables system 100 to function as described herein.

Processor(s) 104 may be configured to provide information-processing capabilities. As such, processor 104 may include one or more of a digital processor, an analog processor, a digital circuit designed to process information, an analog circuit designed to process information, a state machine, and/or other mechanisms for electronically processing information. Although processor 104 is shown in FIG. 1 as a single entity, this is for illustrative purposes only. In some implementations, processor 104 may include one or more processing units. These processing units may be physically located within the same device, or processor 104 may represent processing functionality of a plurality of devices operating in coordination. Processor 104 may be configured to execute components 21-25. Processor 104 may be configured to execute components 21-25 by software; hardware; firmware; some combination of software, hardware, and/or firmware; and/or other mechanisms for configuring processing capabilities on processor 104.

It should be appreciated that although components 21-25 are illustrated in FIG. 1 as being co-located within a single processing unit, in implementations in which processor 104 includes multiple processing units, one or more of components 21-25 may be located remotely from the other components. The description of the functionality provided by the different components 21-25 described above is for illustrative purposes and is not intended to be limiting, as any of components 21-25 may provide more or less functionality than is described. For example, one or more of components 21-25 may be eliminated, and some or all of its functionality may be provided by other ones of components 21-25 and/or other components. As another example, processor 104 may be configured to execute one or more additional components that may perform some or all of the functionality attributed below to one of components 21-25.

Figure 2:
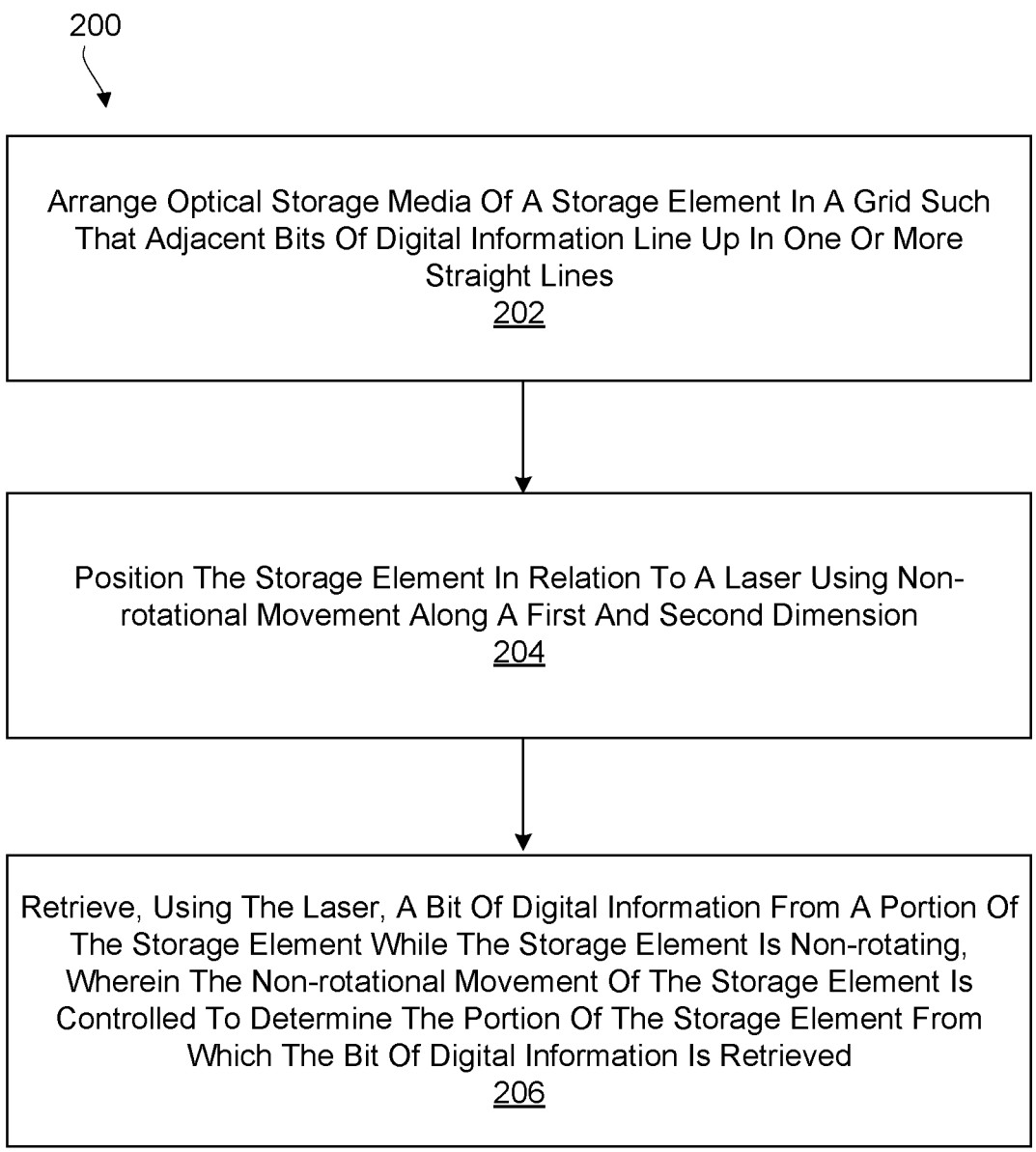
FIG. 2 illustrates a method for non-rotating optical storage of digital information, in accordance with one or more implementations.

FIG. 2 illustrates a method 200 for non-rotating optical storage of digital information, in accordance with one or more implementations. The operations of method 200 presented below are intended to be illustrative. In some embodiments, method 200 may be accomplished with one or more additional operations not described, and/or without one or more of the operations discussed. Additionally, the order in which the operations of method 200 are illustrated in FIG. 2 and described below is not intended to be limiting.

In some embodiments, method 200 may be implemented in a computer system comprising one or more processing devices (e.g., a digital processor, an analog processor, a digital circuit designed to process information, an analog circuit designed to process information, a state machine, and/or other mechanisms for electronically processing information), storage media storing machine-readable instructions, and/or other components. The one or more processing devices may include one or more devices executing some or all of the operations of method 200 in response to instructions stored electronically on electronic storage medium. The one or more processing devices may include one or more devices configured through hardware, firmware, and/or software to be specifically designed for execution of one or more of the operations of method 200.

At an operation 202, optical storage media of a first storage element is arranged in a multi-dimensional grid having at least two dimensions such that adjacent bits of digital information line up in one or more straight lines. In some embodiments, operation 202 is performed by a storage element the same as or similar to storage element 11 (shown in FIG. 1 and described herein).

At an operation 204, the first storage element is positioned in relation to the laser using non-rotational movement along a first and second dimension. In some embodiments, operation 204 is performed by an access subsystem the same as or similar to access subsystem 15 (shown in FIG. 1 and described herein).

At an operation 206, a bit of digital information is retrieved from a portion of the first storage element while the first storage element is non-rotating. The non-rotational movement is controlled to select the portion of the first storage element from which the bit of digital information is to be retrieved. In some embodiments, operation 206 is performed by an optical access component and/or a laser the same as or similar to optical access component 12 and/or laser 26 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured for optical storage of digital information, the system comprising:
an access subsystem that includes one or more optical access components and one or more processors configured by machine-readable instructions, wherein the one or more optical access components include a first optical access component, wherein the access subsystem is configured to position a first storage element in relation to the first optical access component, wherein the first optical access component is configured to retrieve, using one or more lasers, a bit of digital information from a portion of the first storage element while the first storage element is non-rotating and a second bit of digital information from the portion of the first storage element, wherein the first optical access component includes one or more mirrors, and wherein the one or more processors are configured by machine-readable instructions to:
control non-rotational movement of the first storage element in relation to the first optical access component to select the portion of the first storage element from which the bit of digital information is to be retrieved;
control positioning of the one or more mirrors to select the portion of the first storage element from which the bit of digital information is to be retrieved; and
adjust the one or more mirrors between retrieval of the bit and the second bit of digital information, wherein the one or more mirrors are adjusted to select the portion of the first storage element from which the second bit of digital information is to be retrieved.

2. The system of claim 1, wherein the non-rotational movement of the first storage element is controlled along a first dimension and a second dimension.

3. The system of claim 2, wherein the first dimension and the second dimension are orthogonal, and wherein adjacent bits of digital information line up in a straightline.

4. The system of claim 1, further comprising:
a support structure configured to support multiple storage elements, wherein the multiple storage elements include the first storage element, wherein one or both of the access subsystem and the support structure are further configured to selectively transfer the first storage element from the support structure to the access subsystem.

5. The system of claim 1, wherein the one or more storage elements include a second storage element, wherein the one or more access components include a second optical access component, wherein the access subsystem is further configured to position the second storage element in relation to the second optical access component using nonrotational movement along a first and a second dimension, wherein the one or more processors are configured by machine-readable instructions to:
obtain a second bit of digital information;
control non-rotational movement of the second storage element along the first and second dimension in relation to the second optical access component to select a portion of the second storage element on which the second bit of digital information is to be recorded,
wherein the second optical access component is configured to record, using one or more lasers, the second bit of digital information on the portion of the second storage element while the second storage element is non-rotating.

6. The system of claim 1, wherein optical storage media included in first storage element is arranged in a grid such that adjacent bits of digital information line up in a straight line.

7. The system of claim 1, wherein the first storage element includes optical storage media arranged in a multi-dimensional grid, wherein the multi-dimensional grid is orthogonal and regular.

8. The system of claim 1, wherein optical storage media included in the first storage element is positioned on two surfaces that are on opposite sides of the first storage element.

9. A method for optical storage of digital information, the method comprising:
positioning a first storage element in relation to a first optical access component, wherein the first optical access component retrieves, using one or more lasers, a bit of digital information from a portion of the first storage element while the first storage element is non-rotating and a second bit of digital information from the portion of the first storage element, wherein the first optical access component includes one or more mirrors;
controlling non-rotational movement of the first storage element in relation to the first optical access component to select the portion of the first storage element from which the bit of digital information is to be retrieved;
controlling positioning of the one or more mirrors to select the portion of the first storage element from which the bit of digital information is to be retrieved; and
adjusting the one or more mirrors between retrieval of the bit and the second bit of digital information, wherein the one or more mirrors are adjusted to select the portion of the first storage element from which the second bit of digital information is to be retrieved.

10. The method of claim 9, wherein controlling the non-rotational movement of the first storage element includes controlling along a first dimension and a second dimension.

11. The method of claim 10, wherein the first dimension and the second dimension are orthogonal, and wherein adjacent bits of digital information line up in a straight line.

12. The method of claim 9, wherein the first optical access component is included in an access subsystem, the method further comprising:
supporting multiple storage elements, wherein the multiple storage elements include the first storage element;
selectively transferring the first storage element from the support structure to the access subsystem.

13. The method of claim 9, further comprising:
positioning a second storage element in relation to a second optical access component using nonrotational movement along a first and a second dimension,
obtaining a second bit of digital information;
controlling non-rotational movement of the second storage element along the first and second dimension in relation to the second optical access component to select a portion of the second storage element on which the second bit of digital information is to be recorded,
recording, using one or more lasers, the second bit of digital information on the portion of the second storage element while the second storage element is non-rotating.

14. The method of claim 9, wherein optical storage media included in first storage element is arranged in a grid such that adjacent bits of digital information line up in a straight line.

15. The method of claim 9, wherein the first storage element includes optical storage media arranged in a multi-dimensional grid, wherein the multi-dimensional grid is orthogonal and regular.

* * * * *